United States Patent
Venkatramani et al.

(10) Patent No.: US 7,546,377 B2
(45) Date of Patent: Jun. 9, 2009

(54) ALTERNATE STREAM SIGNALING FOR ADAPTIVE STREAM SELECTION

(75) Inventors: Chitra Venkatramani, Roslyn Heights, NY (US); Olivier Verscheure, Hopewell Junction, NY (US); Peter H. Westerink, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 11/502,799

(22) Filed: Aug. 10, 2006

(65) Prior Publication Data

US 2008/0040497 A1    Feb. 14, 2008

(51) Int. Cl.
*G06F 15/16* (2006.01)

(52) U.S. Cl. ................................. 709/232; 709/236
(58) Field of Classification Search ......... 709/230–232, 709/238–241; 725/95, 87
See application file for complete search history.

(56) References Cited

U.S. PATENT DOCUMENTS 6,011,590 A * 1/2000 Saukkonen ............ 375/240.05
2002/0191116 A1 12/2002 Kessler et al.
2004/0172478 A1  9/2004 Jacobs et al.
2004/0199653 A1 10/2004 Amini et al.
2004/0215802 A1 10/2004 Amini et al.
2004/0240390 A1 12/2004 Seckin et al.
2005/0120128 A1 * 6/2005 Willes et al. ............ 709/232
2006/0095944 A1 * 5/2006 Demircin et al. ......... 725/81

OTHER PUBLICATIONS

Thomas Wiegand, Heinrich Hertz Institute, Berlin, Germany "Study of Final Committee Draft of Joint Video Specification" Dec. 5-13, 2002 pp. 1-226.

* cited by examiner

*Primary Examiner*—Salad Abdullahi
(74) *Attorney, Agent, or Firm*—F. Chau & Associates, LLC

(57) ABSTRACT

A signal stream is transmitted when an available transmission bandwidth becomes reduced by providing alternate signal streams of different bit rates from the same source. The alternate signal streams are sub-sampled to form frames that have particular identifiers added thereto. The server is informed in advance, before actually providing the frames, of the identifiers. Because the server knows the current bandwidth limitations and knows the identifiers of the frames, the server can pass for transmission only those frames of the alternate signal stream that can fit within the transmission bandwidth that is available.

7 Claims, 2 Drawing Sheets

ALTERNATE STREAM SIGNALING FOR ADAPTIVE STREAM SELECTION

BACKGROUND OF THE INVENTION

1. Technical Field

The disclosure relates generally to the transmission of audio and video signals from a server to a client.

2. Discussion of the Related Art

Conventional multimedia streaming systems typically stream a single audio stream and a single associated video stream from a source, typically called the "server", to a destination, typically called the "client". The combined bandwidth of the audio and video signal streams defines the required channel bandwidth between the server and the client. If this channel bandwidth is reduced because of, for example, congestion, then conventional server systems have little or no means of adequately dealing with this bandwidth reduction problem and transmission must cease. Therefore, modern multimedia server systems employ various techniques that allow a source, such as a server, to adapt to a reduction in server-client bandwidth.

One known approach to solving this problem is to make multiple alternate audio and video streams available to the server, where the alternate streams are encodings of the same content but with different bandwidths. This gives the server the option of selecting the most appropriate audio/video signal streams for transmission to the client. In a further refinement of this approach, each alternate stream can also be sub-sampled, where the server selectively transmits only parts of an alternate audio/video stream, thereby permitting more choice in adapting the audio/video stream bandwidths to the actual server/client channel capacity.

The source of the multiple alternate streams need not necessarily be a part of the same system as the server system that connects to the various clients and that performs the bandwidth adaptation. An example of such a system providing multiple alternate signal streams is shown in FIG. 1, where an encoding system 10 encodes an audio signal and or video signal each with various different bandwidths, that is, the signals are encoded at various different bit rates. The encoding system 10 sends all the alternate streams to a stream selection system 20, denoted as a server. The stream selection system selects and forwards the appropriately encoded signals, possibly sub-sampled, to each client 30-*l* to 30-*n* that is connected to or communicating with the stream selection system 20.

In a system configuration such as shown in FIG. 1, certain information must be conveyed from the encoding system 10 to the stream selection system 20, in order for the stream selection system 20, that is, the server, to know which streams it is receiving and what the selection options are.

SUMMARY OF THE INVENTION

Exemplary embodiments of the present invention provide methods for signaling alternate streams and sub-samplings thereof, such that the server system has all the required information to be able to dynamically select the appropriate alternate stream, as well as the possible sub-sampling thereof for subsequent transmission to the clients.

A signal stream can be transmitted successfully over a transmission channel even though the bandwidth becomes reduced by providing alternate signal streams having the same content. The alternate signal streams are sub-sampled to form frames of different respective sampling rates. Each frame is provided with an identifier that identifies the kind of frame and relates to the bandwidth required for its transmission. Before any signals are actually provided to the serve, the server is provided with a list of the identifiers for all of the possible frames of the alternate signal streams. The alternate signal streams are then sent to the server where they are either passed or blocked based on the identifiers and the bandwidth constraints that are present at that time. In this way, if the bandwidth of the channel becomes reduced, the server can still provide the signal stream by selecting those frames that do not exceed the bandwidth that is available.

BRIEF DESCRIPTION OF THE DRAWINGS

Exemplary embodiments of the present invention can be understood in more detail from the following descriptions taken in conjunction with the accompanying drawings.

DESCRIPTION OF EXEMPLARY EMBODIMENTS

Before describing the features of the exemplary embodiments of the present invention, the meanings of some terms should be made clear.

Figure 1:
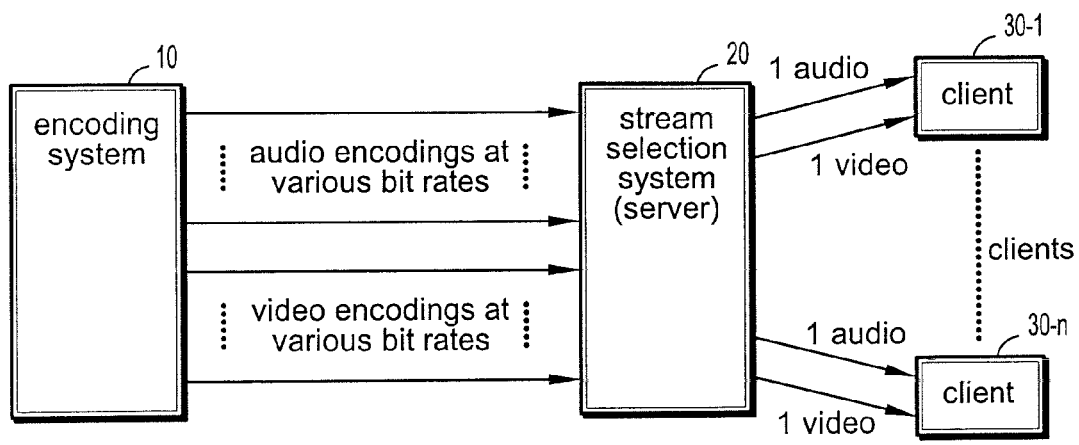
FIG. 1 is a representation of a conventional multimedia streaming system known in the prior art.
Figure 2:
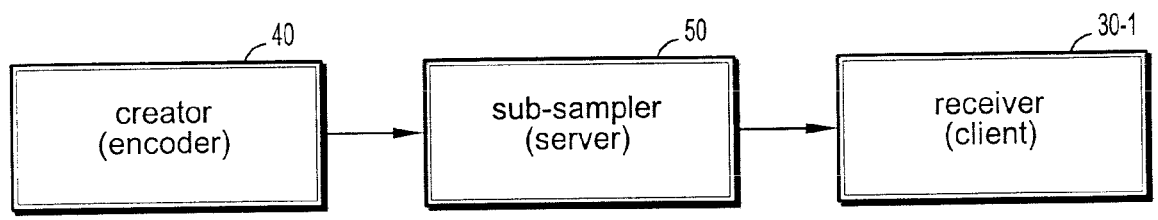
FIG. 2 is a representation of a signal stream transmission system according to an exemplary embodiment of the present invention.

A stream refers to an encoding that consists of a sequence of frames of different types. For example, in an MPEG encoded video stream, we can distinguish between I-frames, P-frames, and B-frames, which as is known have to do with the tense, past and future, of the video data frames. As shown in FIG. 2, a stream creator (encoder) 40 always sends a complete stream that includes all of the MPEG frame types to a sub-sampler (server) 50. The server 50 blocks certain frame types or passes the certain frame types on to a receiver (client) 30-*l*, for example.

The creator or encoder 40 understands the streams and defines stream configurations that consist only of certain frame types. Because a configuration consists of a sub-set of frame types, it can also be regarded as a sub-sampled version of the complete stream. It is a function of the sub-sampler 50 to block or pass incoming frames according to the stream configuration that is currently in use, as determined by the creator 40.

For example, in the case of MPEG video, the creator 40 can define several stream configurations "Si" depending on the number of B-frames. This is shown in the following chart.

|    | 3 B-frames |    |    |    |   | 2 B-frames |    |    |   | 1 B-frame |    |   | 0 B-s |   |
|----|---|----|----|----|---|---|----|----|---|---|----|---|---|---|
| S1 | I | Be | Bo | Be | P | I | Be | Bo | P | I | Be | P | I | P |
| S2 | I | Be | —  | Be | P | I | Be | —  | P | I | —  | P | I | — |
| S3 | I | —  | Bo | —  | P | I | —  | —  | P | I | —  | — |   |   |
| S4 | I | —  | —  | —  | P | I | —  | —  | — |   |    |   |   |   |
| S5 | I | —  | —  | —  | — |   |   |    |    |   |   |    |   |   |   |

In this example, if the creator 40 encodes an MPEG video stream with one B-frame, the creator 40 will tell the sub-sampler 50 that there are three different sub-sampling configurations possible. As shown in the above chart, these possibilities are: (1) no sub-sampling, that is, pass all frames; (2)

sub-sample by dropping all B-frames; and (3) sub-sample by passing only the I-frames to the receiver.

Figure 3:
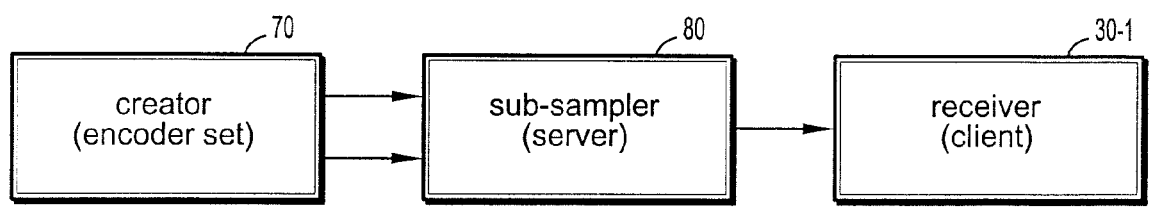
FIG. 3 is a representation of a signal stream transmission system according to an exemplary embodiment of the present invention.

To provide a greater capability for adaptation and to overcome the bandwidth restriction problem, an encoder, such as the creator 40, can encode not just a single stream, but multiple streams from the same source. These alternate encoding streams will have different respective bit rates, thereby providing the server 50 with more choices available to match the server/client bandwidth, because it can choose between alternate encodings, each with a choice of sub-samplings. This multiple alternate stream embodiment is shown in FIG. 3.

As an example of using the system shown in FIG. 3, if the encoder or creator 70 creates two alternate MPEG video streams of the same source material, for example, one with one B-frame, alternate stream 1, and one with no B-frames, alternate stream 0, the server 80 has a choice of selecting from among five different configurations, as listed below.

1. No sub-sampling of the alternate stream 1: pass frames I0, P0, and B0.
2. Block the B-frames of the alternate stream 1: pass frames I0 and P0.
3. Pass only the I-frames of the alternate stream 1: pass frames I0.
4. No sub-sampling of the alternate stream 0: pass frames I1 and P1.
5. Pass only the I-frames of the alternate stream 0: pass frames I1.

In order for the server 80 to make an informed choice, the encoding system, that is, the creator 70, must inform the server system, that is, the sub-sampler 80, beforehand as to which alternate streams the sub-sampler 80 will be receiving before actually sending the alternate streams themselves. Moreover, because an alternate stream may be sub-sampled by the server 80, each sample, that is, each frame, in each stream must be marked in some way, so that the server 80 can make the best choice between forwarding or dropping each particular sample, as explained above in connection with the five possible choices in that example.

For signaling or identifying the alternate streams, the encoding system 70 always informs the server 80 beforehand of the alternate stream identification ID's, and all samples are marked with the proper stream ID identifying the stream that they belong to. Thus, the sub-sampler 80 knows in advance the specific ID's of all the signal streams it might possibly receive. For signaling the sub-samplings, however, two different methods can be employed.

In the first method, the samples of a certain alternate stream are marked with a list of the ID's of the sub-sampled streams to which the sample belongs. The signaling beforehand from the creator 70 informs the server 80 of the ID's for all possible sub-samplings for each alternate stream.

For example, in an MPEG video stream with one B-frame, the signaling from the creator 70 identifies beforehand three different streams: stream ID 0 containing I-frames only, stream ID 1 containing I and P-frames, and stream ID 2 containing all three frame types, I, P, and B. I-frames will then be marked with a 0, 1 and 2 because an I-frame belongs to all three streams, P-frames will be marked with a 1 and 2, and B-frames will be marked with a 2. Note that these lists of the ID's are typically encoded themselves in order to promote bandwidth efficiency.

In the second method, the samples of a certain alternate stream, not necessarily an MPEG video stream, are marked with the sample type, and the signaling provided beforehand informs the server of which sample types belong to which possible sub-samplings of that alternate stream.

For example, in an MPEG video stream with one B-frame, an I-frame is marked with a "0", a P-frame is marked with a "1", and a B-frame is marked with a "2". The signaling beforehand then informs the server of three sub-sampled streams: one sub-sampled stream with only I-frames, thus, stream 0 contains frame types "0"; one sub-sampled stream with I and P-frames, thus, stream 1 contains frame types "0" and "1"; and the third sub-sampled stream containing all frame types, thus, stream 2 contains frame types "0", "1", and "2".

As an example of how and where to provide the stream information to the server, there is a standardized method of multimedia streaming, where the real-time streaming protocol (RTSP) is used for the control, the session description protocol (SDP) is used for the up-front or beforehand session information and the transport protocol for real-time application (RTP) is used for the data transport. When using these protocols, the alternate stream and sub-sampling information can be inserted beforehand in the session description protocol by adding extension lines. The sample mark-up with the sub-sampling information, either the sub-sample stream ID or the frame type, can be added to the transport protocol for real-time applications header, for example, in the CSRC field. Note that certain encoding standards like MPEG-4 video already have frame type indications in the video stream itself, but in general this is not sufficient signaling, although it can be used, if the system is designed to deal with it. The video data stream might be encrypted, however, making that information inaccessible, thus requiring some other type of implicit signaling. Secondly, although the examples given above are for MPEG I, P, and B-frames, it is possible that the encoder 40 can define two different types of I-frames, such as "all I-frames" and "every other I-frame".

The above explanation of an exemplary embodiment is provided using the MPEG system and its conventional terminology as an example. Nevertheless, the present inventive principles also apply to other coding systems using somewhat different terms. For example, a recent video coding technique known as AVC has features similar to MPEG but refers to frame types differently, such as an IDR picture, which is the equivalent of an I-frame. Thus, in the above discussion, the word frame could also stand for sample or picture and streams may be subsampled based upon, for example the frame type.

Although exemplary embodiments of the invention have been described herein with reference to the accompanying drawings, it is to be understood that the invention is not limited to these exemplary embodiments, and that various other changes and modifications may be effected therein by one skilled in the art without departing from the scope or spirit of the invention. All such modifications and changes are intended to be included within the scope of the invention, as defined by the appended claims.

The invention claimed is:

1. A method for transmitting a signal stream over a transmission path having a known limited bandwidth, the method comprising the steps of:
    encoding a plurality of alternate signal streams having the same content, wherein each of the plurality of alternate signal streams is encoded into a plurality of frames, each requiring a different bandwidth for transmission;
    informing a server before any signals are actually provided to the server of a list of respective identifiers for all possible frames for each of the plurality of alternate signal streams, wherein each identifier identifies the kind of frame and relates to the bandwidth required for its transmission;

selecting for forwarding or blocking at a server, each of the plurality of frames based on the respective identifiers and the bandwidth presently available for transmission; and causing the server to transmit to a receiver those frames that have been selected for forwarding.

2. The method of claim 1, wherein the signal stream is an MPEG video stream and the step of encoding includes defining the frames as B frames, P frames, and I frames.

3. The method of claim 1, wherein the step of informing includes providing the list to the server including all possible sub-samplings forming the frames of all alternate signal streams.

4. A method for signaling an alternate stream and adaptive stream selection comprising the steps of:

providing alternate signal streams of identical content;

defining stream configurations that consist of only certain frame types making up the alternate signal streams, wherein each configuration consists of a sub-set of frame types;

informing a sub-sampler before any signals are actually provided to the sub-sampler of a list of respective identifiers for all different sub-sampling configurations that are possible, wherein each identifier identifies the kind of frame and relates to the bandwidth required for its transmission; and performing one of blocking and passing incoming frames according to a stream configuration currently in use.

5. The method of claim 4, wherein the signal streams are MPEG video streams and the frame types are B frames, P frames, and I frames.

6. The method of claim 4, further comprising the step of transmitting to a client receiver the signal stream passed in the step of performing passing of incoming frames.

7. A method for transmitting a signal stream, comprising the steps of:

encoding multiple streams using the same source to produce alternate encodings having different respective bit rates, wherein the encoding produces frames of each of the multiple streams;

providing an identification for each frame produced in the step of encoding;

informing a server before any signals are actually provided to the server of a list of respective identifiers for the identifications provided to the different types of frames in the multiple streams, wherein each identifier identifies the kind of frame and relates to the bandwidth required for its transmission;

passing selected frames of the multiple streams based on the identifications and a known transmission bandwidth;

blocking all frames not selected in the step of passing; and transmitting from the server to a client/receiver all frames selected in the step of passing.

* * * * *